United States Patent [19]
Miller

[11] Patent Number: 5,467,826
[45] Date of Patent: Nov. 21, 1995

[54] OILFIELD TUBING STRING INTEGRALLY ENCLOSING A FLUID PRODUCTION OR INJECTION TUBE AND A SERVICE LINE

[75] Inventor: Troy A. Miller, Anchorage, Ak.

[73] Assignee: Marathon Oil Company, Findlay, Ohio

[21] Appl. No.: 316,535

[22] Filed: Sep. 30, 1994

[51] Int. Cl.$^6$ .............................. E21B 17/18; E21B 34/10
[52] U.S. Cl. ........................ 166/380; 166/375; 166/384
[58] Field of Search .................................. 166/242, 117.5, 166/269, 313, 375, 380; 138/111, 115, 116, 117, 110, 171

[56] References Cited

U.S. PATENT DOCUMENTS

| | | |
|---|---|---|
| 183,348 | 10/1876 | Warhurst . |
| 1,829,638 | 10/1931 | Egler ........................................ 138/171 |
| 2,067,078 | 1/1937 | Faber .................................... 138/116 X |
| 2,151,206 | 3/1939 | Hawthron . |
| 2,279,090 | 4/1942 | Markey ................................. 138/116 X |
| 2,806,429 | 9/1957 | Anderson et al. .................... 166/313 X |
| 2,929,408 | 3/1960 | Weatherwax et al. ............... 138/115 X |
| 2,968,918 | 1/1961 | Denison, Jr. ...................... 138/111 UX |
| 3,066,702 | 12/1962 | Tumavicus ............................. 138/111 |
| 3,110,754 | 11/1963 | Witort et al. ............................. 174/70 |
| 3,279,500 | 10/1966 | Feder .................................... 138/115 X |
| 3,354,286 | 11/1967 | Worden et al. ........................... 219/8.5 |
| 3,524,478 | 8/1970 | Rapp et al. ............................... 138/111 |
| 3,903,929 | 9/1975 | Mock ....................................... 138/115 |
| 4,064,355 | 12/1977 | Neroni et al. ........................ 138/115 X |
| 4,200,297 | 4/1980 | Tricon .................................. 166/242 X |

FOREIGN PATENT DOCUMENTS

729659   5/1955   United Kingdom ................... 138/115

*Primary Examiner*—Stephen J. Novosad
*Attorney, Agent, or Firm*—Jack L. Hummel; Jack E. Ebel

[57] ABSTRACT

An integrated oilfield tubing string is provided with two continuous fluid-isolated interior passageways extending longitudinally therethrough, wherein the first interior passageway serves as a production or injection tube and the smaller second interior passageway serves as a service line. The second passageway has a crescentic cross section and is formed by affixing the longitudinal edges of an elongated arcuate band to the inside or outside of the tube while maintaining a space between the band and the tube wall. The internally and externally exposed surfaces of the tube and band define relatively smooth convex outside and concave inside surfaces of the integrated tubing string. The present invention further provides a method of constructing the integrated tubing string.

22 Claims, 3 Drawing Sheets

OILFIELD TUBING STRING INTEGRALLY ENCLOSING A FLUID PRODUCTION OR INJECTION TUBE AND A SERVICE LINE

BACKGROUND OF THE INVENTION

1. Technical Field

The present invention relates to an oilfield tubing string and to a method for constructing the oilfield tubing string, and more particularly, the present invention relates to an oilfield tubing string having two passageways extending in fluid isolation therethrough and to a method for constructing the oilfield tubing string.

2. Description of Related Art

In many coiled tubing completions of hydrocarbon production wells, a safety valve is provided across the coiled production tube a predetermined distance beneath the surface to block the flow of produced hydrocarbon fluids through the production tube in the event of a tubing leak or other well failure downstream of the safety valve. Selective closure of the valve enables the operator to effectively prevent the escape of produced hydrocarbons into the surrounding environment should such a failure occur. Accordingly, the safety valve provides a means for reducing the environmental risk of hydrocarbon pollution when a hydrocarbon production well is placed in an environmentally sensitive locale, such as a wilderness area or an undersea aquatic habitat.

For offshore applications, placement of the subsurface safety valve is typically beneath, but relatively near, the sea floor. For onshore applications, placement of the safety valve is typically relatively shallow, i.e., within about twenty to forty meters of the earthen surface. Conventional subsurface safety valves are selectively actuated by means of a pressure signal transmitted to the valve from the surface. Accordingly, a service line, more specifically termed a control line, is provided to transmit the actuating pressure signal to the valve. The control line provides pressure communication between a pressure signal transmitter controlled by an operator at the surface and a valve actuator at the subsurface safety valve. The pressurizable control line extends from the surface to the safety valve alongside the production tube and has a cylindrical configuration with a convex external surface retaining a hydraulic or pneumatic fluid in the line.

The conventional safety valve is enclosed within a housing having an external nipple to receive the control line and having central inlet and outlet fittings to receive the ends of the production tube above and below the safety valve, respectively. The production tube is generally the primary conduit for producing hydrocarbons from the subterranean hydrocarbon-bearing formation to the surface. Accordingly, the production tube is considerably larger than the control line with respect to both the inside and outside diameters thereof. When running the control line alongside the production tube, it is common practice to bind the control line to the outside of the production tube with metal straps encircling the production tube and control line at periodically spaced intervals. The bound configuration simulates a unitary integrated tubing string that facilitates placement of the production tube and control line in the wellbore during completion of the well. The bound configuration, however, subsequently impairs the ability of the operator to perform successful workovers by limiting the available means for maintaining pressure control in the well.

Pressure control is conventionally maintained in a well during workovers by killing the well or alternatively, by preserving the live well, but pressure sealing the well with the production tube in place or stripped from the wellbore. Killing the well is the least desirable means for maintaining pressure control because it requires the placement of weighted kill fluids in the well that can damage the producing interval and diminish subsequent hydrocarbon production therefrom. Unfortunately, neither live means identified above for maintaining pressure control in the well is available when the control line is bound to the outside of the production tube. The bound configuration has an irregular outside surface with concavities formed therein resulting from the intersection of the cylindrical production tube and cylindrical control line. From a practical standpoint, the concavities prevent pressure sealing the well when the production tube and control line are retained in place within the well. The irregular surface of the bound configuration likewise prevents stripping the production tube and control line from the well to enable pressure sealing of the well thereafter. Thus, the presence of a coiled production tube and associated control line in a bound configuration undesirably dictates killing the well whenever a workover of the well is to be performed.

An alternate configuration for the coiled production tube and associated control line positions the control line internal to the production tube with the outside surface of the control line affixed to the inside surface of the production tube. Although the resulting structure has a convex outside surface free of concavities that enables pressure sealing of the well while the production tube and control line remain in place, the configuration is nevertheless unsatisfactory for well workovers. The presence of the cylindrical control line in the interior of the production tube impedes the passage of standard-size workover equipment, such as tools, plugs, perf guns, and the like, through the tube during workovers because the radially protruding control line inordinately diminishes the inside diameter of the tube. The cylindrical control line is also susceptible to damage or closure when workover equipment passes alongside it because the convex outside surface of the control line typically has a relatively thin wall thickness that is easily deformed when impinged against by workover equipment.

Accordingly, it is an object of the present invention to provide an integrated tubing string having a pair of pressure and/or fluid isolated passageways extending from a wellhead into a wellbore penetrating a subterranean hydrocarbon-bearing formation. It is a further object of the present invention to provide such a tubing string, wherein the first passageway is a tube for recovering hydrocarbon fluids from the formation or injecting hydrocarbon recovery fluids into the formation and the second passageway is a service line for communicating between the surface and the wellbore independent of the first passageway.

More particularly, it is an object of the present invention to provide an integrated tubing string containing a fluid passageway for transmitting fluids through a wellbore and containing a pressure passageway in pressure isolation from the fluid passageway for transmitting pressure signals through a wellbore. Still more particularly, it is an object of the present invention to provide a fluid production tube and an associated pressurizable control line that permits pressure maintenance of a live hydrocarbon production well while the production tube and control line remain in place during well workovers. It is another object of the present invention to provide a fluid production tube and an associated pressurizable control line that permits passage of standard-size workover equipment through the tube during well workovers. It is yet another object of the present invention to provide a pressurizable control line and a fluid production tube having a smooth concave inside surface contained within an integrated tubing string having a smooth convex outside surface. It is a further object of the present invention to provide a fluid production tube and a pressurizable control line contained within an integrated tubing string wherein the fluid production tube is sized in correspondence with conventional fluid production tubing.

It is also an object of the present invention to provide a process for constructing an integrated tubing string having a pair of pressure and/or fluid isolated passageways extending from a wellhead into a wellbore penetrating a subterranean hydrocarbon-bearing formation. It is more particularly an object of the present invention to provide a process for constructing an integrated tubing string containing a fluid passageway for transmitting fluids through a wellbore and containing a pressure passageway in fluid isolation from the fluid passageway for transmitting pressure signals through a wellbore. It is still more particularly an object of the present invention to provide a process for constructing a tubing string integrating a fluid production tube and a pressurizable control line therein, wherein the tubing string has a smooth outside surface and a smooth inside surface. It is yet a further object of the present invention to provide a process for constructing a tubing string integrating a fluid production tube and a pressurizable control line therein, wherein the fluid production tube is sized in correspondence with conventional production tubing. These objects and others are achieved in accordance with the invention described hereafter.

SUMMARY OF THE INVENTION

The present invention is an integrated tubing string positionable in a wellbore and having two continuous interior passageways extending longitudinally therethrough in fluid and/or pressure isolation from each other. In accordance with a first embodiment, the first interior passageway of the tubing string is defined by a continuous length of material configured as an elongated cylindrical tube with a smooth inside surface and a smooth outside surface. Thus, the first interior passageway is bounded in its entirety by the tube and has a substantially smooth circular cross section.

The second interior passageway of the tubing string is defined by a continuous length of material configured as an elongated arcuate band with a concave inside surface and a convex outside surface. The longitudinal edges of the arcuate band intersect the outside surface of the tube forming a continuous pressure seal along the intersection of each edge with the tube. A continuous space is maintained between the inside surface of the arcuate band and a portion of the outside surface of the tube which serves as the second interior passageway of the tubing string. Thus, the second interior passageway has a substantially crescentic cross section. The cross-sectional area of the second interior passageway is characterized as being substantially less than the cross-sectional area of the first interior passageway.

The externally exposed outside surfaces of the tube and the band jointly define the outside surface of the integrated tubing string enclosing the first and second interior passageways. The arc of the band is dimensioned relative to the arc of the tube such that the outside surface of the tubing string is relatively smooth and free of concavities, even along the intersection of the band and tube. Consequently, the integrated tubing string has a smooth regular outside surface with a substantially smooth oval cross section, wherein oval is alternately termed egg-shaped or broadly elliptical.

In accordance with a second embodiment of the integrated tubing string of the present invention, the configuration is similar to that of the first embodiment comprising an elongated tube and an arcuate band, each with an inside surface and an outside surface. The arcuate band, however, is positioned within the interior of the tube such that the longitudinal edges of the arcuate band are pressure sealed to the inside surface of the tube, rather than the outside surface. A continuous space serving as the second interior passageway of the tubing string is maintained between the outside surface of the arcuate band and a portion of the inside surface of the tube.

The first interior passageway of the tubing string is jointly defined by the internally exposed inside surfaces of the tube and the band. The arc of the band is dimensioned relative to the arc of the tube such that the inside surface of the first passageway is relatively smooth and free of concavities, even along the intersection of the band and tube. Accordingly, the first passageway has a smooth regular inside surface with a substantially smooth oval cross section, while the second passageway retains a crescentic cross section. The integrated tubing string has a smooth regular outside surface defined in its entirety by the outside surface of the tube and has a smooth circular cross section.

Regardless of the particular embodiment selected, the integrated tubing string of the present invention has general utility to oilfield applications, wherein the tubing string is extended from a wellhead into a wellbore of an associated well. The well is either a production well employed to recover hydrocarbon fluids from a subterranean hydrocarbon-bearing formation or an injection well employed to inject fluids into a subterranean hydrocarbon-bearing formation to facilitate the recovery of hydrocarbons therefrom.

The integrated tubing string has specific utility to hydrocarbon production wellbores having a subsurface safety valve positioned therein. The integrated tubing string is extended to the depth of the subsurface safety valve and is connected across the safety valve to the segment of the hydrocarbon production tube extending from the safety valve down the wellbore to the production interval. As such, the first interior passageway of the integrated tubing string functions as the upper segment of the production tube, transporting produced hydrocarbon fluids from the subsurface safety valve to the wellhead.

The second interior passageway has a pressure-transmitting fluid maintained therein, such as a hydraulic or pneumatic fluid, and is pressure-communicatingly connected to an actuator on the subsurface safety valve and to a pressure signal transmitter at the wellhead. As such, the second interior passageway of the integrated tubing string functions as a service line, and more particularly a pressurizable control line, for the subsurface safety valve enabling an operator at the surface to open or close the valve as desired.

Alternatively, the integrated tubing string has specific utility to injection wellbores used to inject hydrocarbon recovery fluids into a subterranean hydrocarbon-bearing formation to facilitate the recovery of hydrocarbons therefrom. The injection well, like the production well, has a subsurface safety valve positioned therein. In accordance with the present embodiment, the tubing string is extended into the wellbore and the first interior passageway is connected across the subsurface safety valve to the segment of the injection tube extending from the safety valve down the wellbore to the injection interval. The first interior passageway functions as the upper segment of the injection tube, transporting hydrocarbon recovery fluids from the wellhead to the subsurface safety valve. As in the previous embodiment, the second interior passageway functions as the pressurizable control line for the subsurface safety valve.

The integrated tubing string has further utility to other oilfield applications of the present invention. When installed in a production well, the second interior passageway of the integrated tubing string can function as a service line for the injection of materials from the surface into the production stream via a ported nipple. For example, the service line can be employed to inject methanol into a gas well or to inject a dispersant into an oil well exhibiting excessive paraffin deposition. In the case of an injection well, the second interior passageway can function as a service line for the injection of materials from the surface into the injection stream in fluid isolation from materials being injected into the wellbore via the injection tube.

The present invention further comprises a method of constructing the above-described integrated tubing string. Construction is initiated by longitudinally positioning a flat first band beneath a precurved second band. Both bands have about the same length, but the first band is substantially broader than the second band. While maintaining the longitudinal alignment of the bands, the longitudinal edges of the precurved second band are brought into engagement with the facing surface of the flat first band and welded along a pair of coextensive seams at the intersection of the two bands.

In accordance with the above-described first embodiment of the integrated tubing string, the flat first band is rolled in a direction away from the second band bringing the longitudinal edges of the first band into engagement with one another while a longitudinally continuous space is maintained between the facing surfaces of the first and second bands. The longitudinal edges of the first band are welded together along a seam, thereby defining a tubular interior passageway having a circular cross section bounded by the seam and the inside surface of the first band. The first and second bands define a crescentic interior passageway bounded by the two seams of intersection between the first and second bands as well as the by facing surfaces of the first and second bands.

In accordance with the above-described second embodiment of the integrated tubing string, the flat first band is rolled in a direction toward, rather than away from, the second band. Thus, when the longitudinal edges of the first band are welded together along the seam, an interior passageway having an oval cross section is defined thereby, bounded by the interiorly exposed surface of the second band and a portion of the surface of the second band. The crescentic interior passageway remains defined by the first and second bands, bounded by the two seams of intersection between the first and second bands as well as the facing surfaces of the first and second bands.

The invention will be further understood, both as to its structure and operation, from the accompanying drawings, taken in conjunction with the accompanying description, in which similar reference characters refer to similar parts.

DESCRIPTION OF PREFERRED EMBODIMENTS

Figure 1:
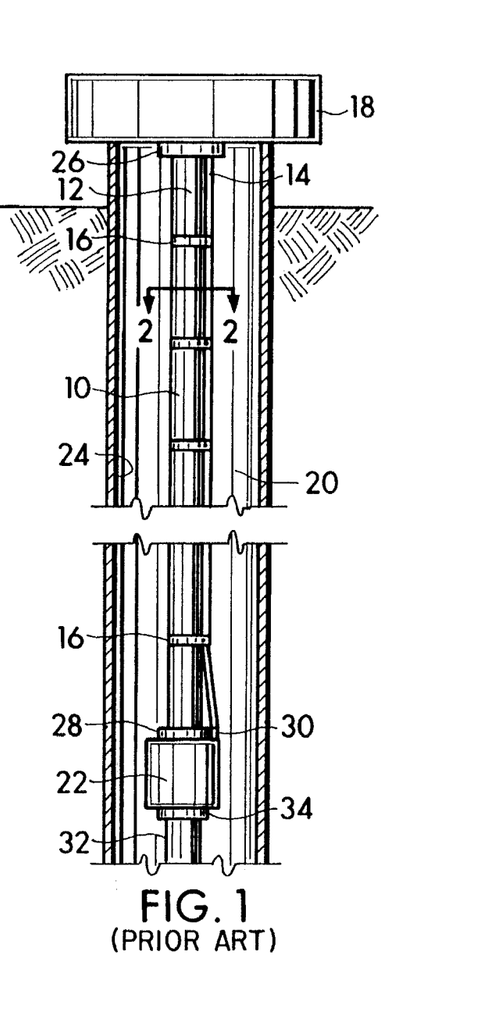
FIG. 1 depicts a conventional hydrocarbon production tube positioned in a wellbore having a conventional control line bound thereto in a manner taught by the prior art.
Figure 2:
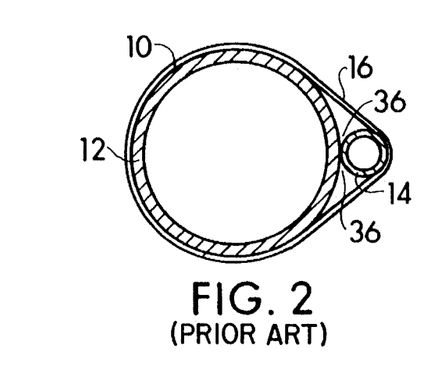
FIG. 2 is a cross-sectional view of the conventional bound production tube and control line configuration as shown along line 2—2 in FIG. 1.

A conventional tubing string employed in a wellbore having a subsurface safety valve is described with reference to FIGS. 1 and 2. The tubing string is generally designated 10 and comprises an upper segment of coiled production tube 12 and a pressurizable valve control line 14 running alongside the upper segment of production tube 12 and externally bound thereto by a plurality of straps 16 encircling the production tube 12 and control line 14 at periodically spaced intervals. The tubing string 10 extends from a tubing hanger 18 at the surface wellhead into a hydrocarbon production wellbore 20 and down to a housing 22 for a subsurface safety valve. The wellbore 20 is lined with casing 24 and fittings 26, 28 are provided to receive the tubing string 10 into the tubing hanger 18 and the safety valve housing 22, respectively. A downhole nipple 30 is provided on the valve housing 22 that is received by the control line 14 to provide pressure communication between a valve actuator (not shown) in the valve housing 22 and the control line 14.

A lower segment of the coiled production tube 32 that is substantially the same as the upper segment 12 extends from a fitting 34 at the bottom of the valve housing 22 downward through the wellbore 20 to the hydrocarbon production interval (not shown). With the safety valve in an open position, the upper and lower segments of the coiled production tube 12, 32 provide a continuous fluid passageway for produced hydrocarbon fluids from the production interval to the surface wellhead. Although not shown, it is appreciated by the skilled artisan that the upper segment of the production tube 12 is in fluid communication with the production tree at the wellhead and the control line 14 is in pressure communication with a pressure signal transmitter typically positioned at the wellhead in a manner accessible to the well operator.

The upper segment of the production tube 12 and the control line 14 both have circular cross sections distinguishable in that the diameter and area of the upper segment of the production tube 12 are substantially greater than those of the control line 14. The outside diameter of a conventional coiled production tube is typically from about 5.1 to 7.6 centimeters, while the outside diameter of a conventional hydraulic control line typically is from about 0.64 to 0.79 centimeters.

It is noted that the abutting alignment of the control line 14 and production tube 12 provides the tubing string 10 with an irregular outside surface characterized by concavities 36 at the intersection of the production tube 12 and control line 14, as well as by straps 16 protruding from the outside surface of the tubing string 10 periodically along the length thereof. These irregularities effectively prevent pressure sealing of the wellbore 20 when the tubing hanger 18 is removed in preparation for a workover, and likewise prevent stripping of the tubing string 10 from the wellbore 20 in an alternate preparation for a workover.

Figure 3:
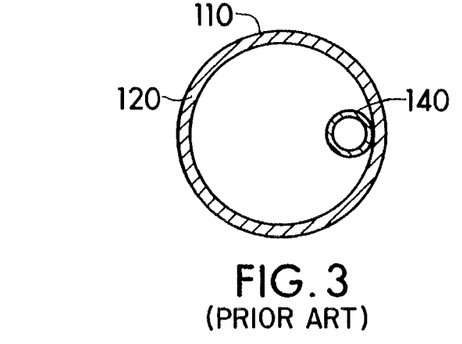
FIG. 3 is a cross-sectional view of an alternate production tube and associated control line configuration taught by the prior art.

An alternately configured conventional tubing string, generally designated 110 with reference to FIG. 3, has a regular outside surface that overcomes the above-described problems encountered with a tubing string having an irregular outside surface. The component parts of the tubing string 110, i.e., the upper segment of the production tube 112 and the control line 114, are substantially identical to the corresponding parts of the tubing string 10. The tubing string 110, however, integrates the upper segment of the production tube 112 and the control line 114 into a unitary structure by extending the control line 114 through the interior of the production tube 112. The outside surface of the control line 114 is welded to the inside surface of the production tube 112 to maintain the control line 114 in place. This configuration is unsatisfactory, however, because it impedes the running of standard-size tools through the production tube 112 during workovers and exposes the control line 114 to damage from the tools.

The integrated tubing string of the present invention provides a solution to the problems encountered with the prior art tubing strings 10, 110 described above. A first embodiment of the integrated tubing string of the present invention is shown and generally designated 210 with reference to FIGS. 4 and 5. Elements common to both FIGS. 1 and 4 showing the environment in which the tubing strings 10 and 210 are employed are identified in FIG. 4 by the same reference numbers as FIG. 1.

Figure 4:
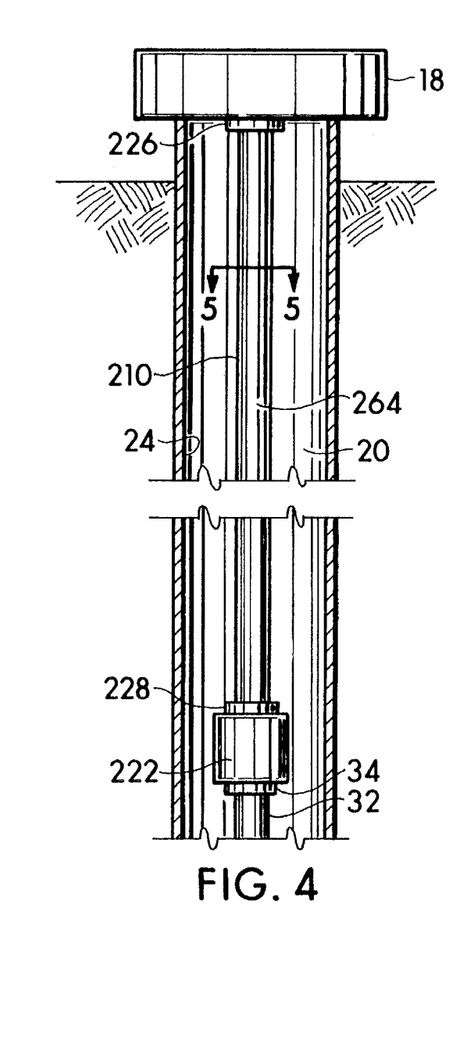
FIG. 4 depicts an embodiment of the integrated tubing string of the present invention positioned in a wellbore.

Referring initially to FIG. 4, the tubing string 210 is positioned in a cased hydrocarbon production wellbore 20 in substantially the same manner as the conventional tubing string 10. The integrated tubing string 210 extends from the tubing hanger 18 at the wellhead to the subsurface safety valve. The fittings 226, 228 provided to receive the tubing string 210 into the tubing hanger 18 and safety valve housing 222 are alternately adapted, however, for the particular cross-sectional configuration of the present tubing string 210. Additionally, the downhole nipple is excluded from the present valve housing 222 insofar as the control line 214 is received into the valve housing 222 directly through the fitting 228. In other respects, the production tree, subsurface safety valve, tubing hanger 18, casing 24, lower segment of the production tube 32, and associated fitting 34 are conventional, being substantially as described above with reference to the conventional tubing string 10.

It is apparent that the length of the tubing string 210 corresponds to the distance between the safety valve housing 222 and the tubing hanger 18 at the wellhead. Where the wellhead is located on an offshore platform, the length of the tubing string 210 is the sum of the height of the platform above the water, the water depth to the sea floor, and the depth of the safety valve in the wellbore below the sea floor. The depth of the valve below the sea floor is typically only several meters. Where the wellhead is located onshore, the length of the tubing string 210 is typically about twenty to forty meters, corresponding to the depth of the safety valve in the wellbore.

The integrated configuration of the tubing string 210 provides it with a regular outside surface that is substantially smooth and free of concavities. The tubing string 210 is described in greater detail hereafter with reference to FIG. 5, wherein the integrated tubing string 210 is shown to enclose two continuous interior passageways 238, 240 extending longitudinally therethrough in fluid and pressure isolation from one another.

Figure 5:
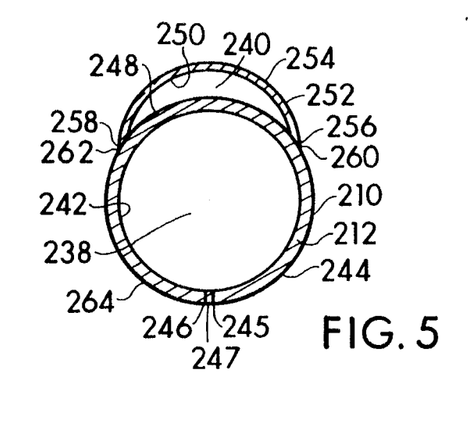
FIG. 5 is a cross-sectional view of the integrated tubing string as shown along line 5—5 in FIG. 4.

The first interior passageway 238 is bounded by an elongated cylindrical tube 212 formed from a high-strength stainless steel and having a smooth circular convex inside surface 242, a smooth circular concave outside surface 244 and two longitudinal edges 245, 246 joined at a longitudinal seam 247. The tube 212 functions in the wellbore 20 as the upper segment of a production tube with the first interior passageway 238 providing a continuous fluid conduit for transporting produced hydrocarbon fluids from the subsurface safety valve to the wellhead. The tube 212 has substantially the same characteristics and dimensions as conventional coiled tubing to facilitate uniform handling of the tube 212 and to facilitate interfacing the tube 212 with the lower segment of the production tube 32 which is commonly formed from conventional coiled tubing. Being dimensionally correlated to conventional coiled tubing, the tube 212 of tubing string 210 typically has an outside diameter from about 5.1 to 7.6 centimeters, a wall thickness from about 0.34 to 0.48 centimeters, and an interior passageway 238 having a smooth circular cross section.

The second interior passageway 240 of the tubing string 210 has a crescentic cross section that is bounded by a smooth convex surface 248 and a smooth concave surface 250 of the tubing string 210. The convex surface 248 corresponds to a portion of the outside surface 244 of the tube 212, while the concave surface 250 is the inside surface in its entirety of an elongated arcuate band 252 formed from a high-strength stainless steel having a convex outside surface 254 opposite the concave inside surface 250. The open-curve arcuate band 252 has a typical thickness of about 0.15 to about 0.25 centimeters. The longitudinal edges 256, 258 of the arcuate band 252 intersect the outside surface 244 of the tube 212 and are welded thereto forming continuous pressure-sealed and fluid-sealed seams 260, 262 along the intersection of each longitudinal edge 256, 258 with the outside surface 244. The edges 256, 258 are preferably flush with the outside surface 244 at the seams 260, 262 and the seams 260, 262 are preferably substantially free of any concavities such that the entire outside surface 264 of the tubing string 210 is substantially convex. Thus, the externally exposed outside surface 244 of the tube 212 and outside surface 254 of the band 252 jointly define the outside surface 264 of the integrated tubing string 210 integrally enclosing the first and second interior passageways 238, 240.

The second interior passageway 240 functions in the wellbore 20 as a valve control line providing a continuous fluid-filled conduit for transmitting pressure signals from the wellhead to the actuator of the subsurface safety valve. The fluid in the second interior passageway can either be a hydraulic fluid or a pneumatic fluid. The cross-sectional area of the second interior passageway 240 approximates the cross-sectional area of the conventional control line 14, and is substantially less than the cross-sectional area of the first interior passageway 238.

Figure 6:
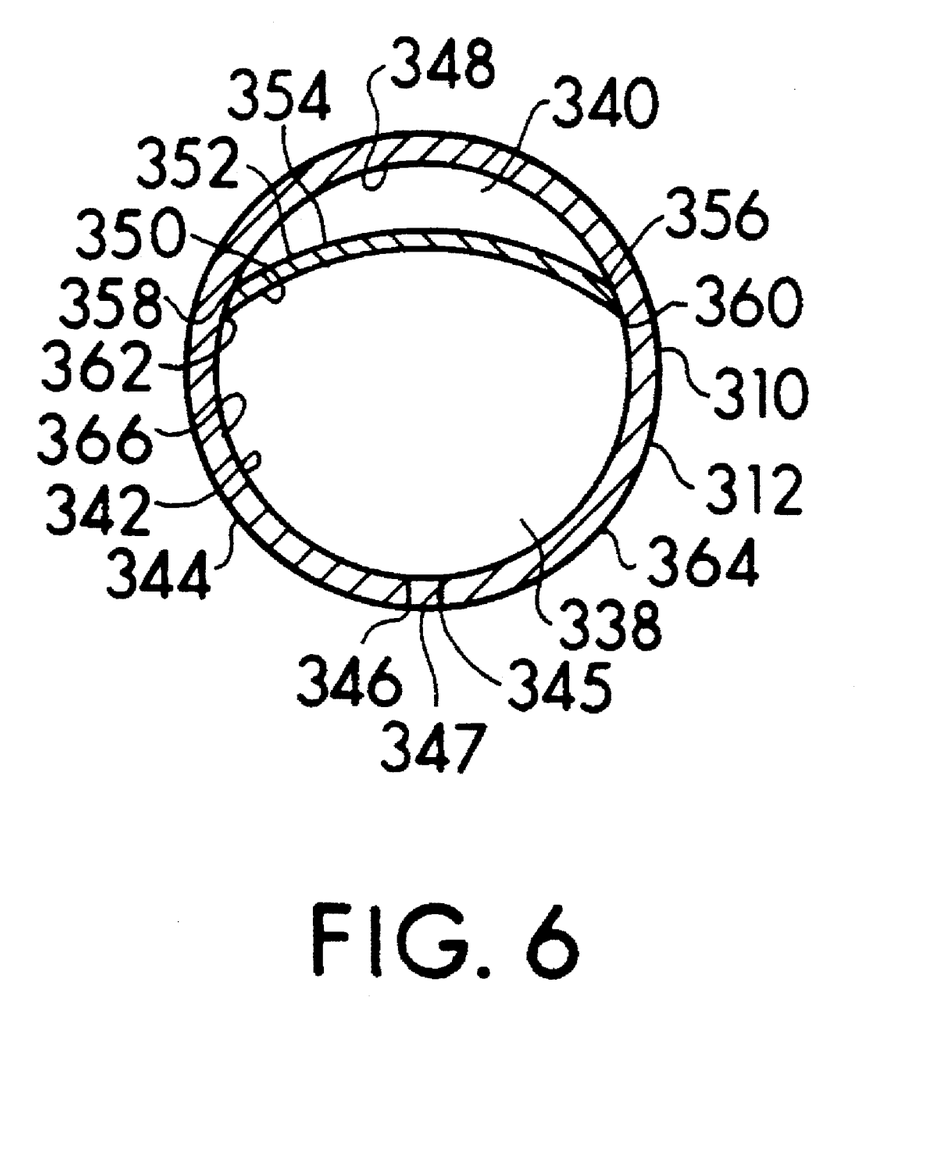
FIG. 6 is an alternate embodiment of the integrated tubing string of the present invention shown in a cross-sectional view similar to that of FIG. 5.

A second embodiment of the integrated tubing string of the present invention is shown and generally designated 310 with reference to FIG. 6. Although not shown, the tubing string 310 is positioned in a cased hydrocarbon production wellbore in substantially the same manner as the tubing string 210 shown in FIG. 4. The tubing string 310 encloses two continuous interior passageways 338, 340 extending longitudinally therethrough in fluid isolation from one another. The first and second interior passageways 338, 340 of the integrated tubing string 310 function in substantially the same manner as those of the integrated tubing string 210.

The tubing string 310 is externally bounded by an elongated cylindrical tube 312 having a smooth circular cross section, smooth regular concave inside and convex outside surfaces 342, 344 substantially free of concavities, and two longitudinal edges 345, 346 joined at a longitudinal seam 347. The tubing string 310 likewise has a smooth regular convex outside surface 364 with a smooth circular cross section.

An open-curve elongated arcuate band 352 having a smooth convex outside surface 354 and a smooth concave inside surface 350 is positioned within the interior of the tube 312 such that the longitudinal edges 356, 358 of the arcuate band 352 intersect the inside surface 342 of the tube 312 and are welded thereto forming continuous pressure-sealed and fluid-sealed seams 360, 362 along the intersection of each longitudinal edge 356, 358 with the inside surface 342. The edges 356, 358 are preferably flush with the inside surface 342 at the seams 360, 362 and the seams 360, 362 are preferably substantially free of any concavities such that the entire inside surface 366 of the tubing string 310, jointly defined by the internally exposed inside surface 342 of the tube 312 and the inside surface 350 of the band 352, is substantially smooth, convex and free of concavities. Thus, the first interior passageway 338 is bounded by the inside surface 366 of the tubing string 310 and has a smooth oval cross section.

The second interior passageway 340 of the tubing string 310 has a crescentic cross section bounded by the convex outside surface 354 of the arcuate band 352 and a concave inside surface 348 corresponding to a portion of the inside surface 342 of the tube 312. The cross-sectional area of the second interior passageway 340 approximates the cross-sectional area of the conventional control line 14, and is substantially less than the cross-sectional area of the first interior passageway 338.

Although the integrated tubing strings 210 and 310 have been described above in the context of a coiled production tube in a hydrocarbon production well, it is apparent to the skilled artisan that the present invention applies generally to other tube constructions, including jointed tubes, and to other wells, including injection wells for hydrocarbon recovery fluids. The integrated tubing strings 210 and 310, and particularly the control lines 240 and 340, have been described above in the context of a specific application for control of a subsurface safety valve. It is apparent to the skilled artisan, however, that the control lines of the present integrated tubing strings are readily adaptable within the scope of the present invention for use as service lines in other oilfield applications, such as for the introduction of fluids from the surface into the wellbore.

METHOD OF CONSTRUCTION

Figure 7:
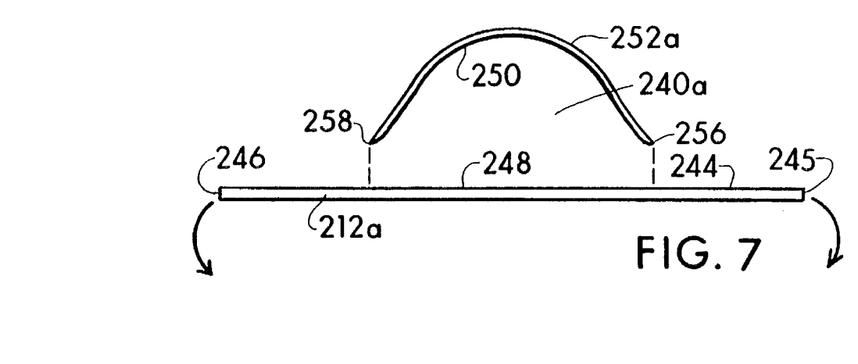
FIG. 7 is an end view of separate components of the integrated tubing string of FIG. 4 aligned in preparation for assembly.

The method of constructing the integrated tubing string 210 is described with reference to FIG. 7, wherein corresponding elements are designated by the same reference numbers used in FIG. 5. Construction of the tubing string 210 is initiated by longitudinally positioning a flat first band 212a beneath a precurved second band 252a, both of which are formed from high-strength stainless steel. It is noted that upon completion of the present method of construction, the flat band 212a is reconfigured as the tube 212 of the tubing string 210 shown in FIG. 5 and the precurved band 252a is reconfigured as the arcuate band 252 of the tubing string 210.

Both bands 212a, 252a have about the same length, but the flat band 212a has a substantially greater width than the arcuate band 252a. While maintaining the longitudinal alignment of the bands 212a, 252a, the longitudinal edges 256, 258 of the precurved band 252a are brought into engagement with the facing outside surface 244 of the flat band 212a in a manner depicted by the dashed lines. The longitudinal edges 256, 258 are welded to the outside surface 244 along the intersection thereof to form a pair of coextensive pressure-sealed and fluid-sealed seams (260, 262 shown in FIG. 5) that are substantially parallel a spaced distance apart from one another. The edges 256, 258 can be beveled to facilitate a flush fit between the longitudinal edges 256, 258 and the outside surface 244.

With the precurved band 252a in place atop the flat band 212a, the longitudinal edges 245, 246 of the flat band 212a are rolled in a direction away from the precurved band 252a depicted by the arrows until the longitudinal edges 245, 246 engage one another. As the flat band 212a is rolled, the precurved band 252a affixed thereto is stretched out, somewhat flattening its curve, although not completely. Consequently, a longitudinally continuous space 240a is maintained between the facing surfaces 248, 250 of the bands 212a, 252a. The curve of the band 252a remains sharper than the curve of the band 212a through conclusion of the present method. To complete construction, the longitudinal edges 245, 246 of the band 212a are welded together to form a fluid-sealed seam 247 (shown in FIG. 5). The final product is the tubing string 210 of FIG. 5.

The integrated tubing string 310 can be constructed by methods known to those skilled in the art. For example, precurved band 352 as illustrated in FIG. 6 could be welded into the interior of a section of tube 312. Alternatively, precurved band 352 (FIG. 6) could be welded onto concave inner surface 348 of a strip of suitable material, for example high-strength stainless steel, in conjunction with, rolling the strip to form a tube 312.

While the foregoing preferred embodiments of the invention have been described and shown, it is understood that alternatives and modifications, such as those suggested and others, may be made thereto and fall within the scope of the present invention.

I claim:

1. A well assembly positionable in a wellbore in fluid communication with a subterranean hydrocarbon-bearing formation across a production interval comprising:

(a) a valve having a pressure-controlled valve actuator; and (b) an integrated tubing string engaging said valve, said tubing string including:

i) a tube having an inside surface and an outside surface, wherein said inside surface of said tube at least partially encloses a first interior passageway having a substantially concave inside surface and said valve is positioned to selectively provide fluid access to said first interior passageway and said outside surface is substantially convex; and ii) an arcuate member having a concave inside surface and a convex outside surface, wherein said member is longitudinally affixed to said tube such that a continuous longitudinal space is maintained between said tube and said member, thereby defining a second interior passageway having a substantially crescentic cross section in pressure communication with said valve actuator and in fluid isolation from said first interior passageway.

2. The well assembly of claim 1 wherein said tubing string has a continuous convex outside surface substantially free of any concavities.

3. The well assembly of claim 1 wherein said arcuate member is longitudinally affixed to said inside surface of said tube.

4. The well assembly of claim 1 wherein said arcuate member is longitudinally affixed to said outside surface of said tube.

5. An oilfield tubing string comprising:

an elongated tube having a first longitudinal seam and an inside surface and an outside surface, the tube having a cross section perpendicular to the direction of elongation with a substantially continuously convex outer boundary, wherein said inside surface of said tube encloses a first interior passageway;

a curved sheet of material having a substantially elongated arcuate configuration with an inside surface, an outside surface, and first and second longitudinal edges, wherein said curved sheet is longitudinally positioned outside said tube such that said outside surface of said tube faces said inside surface of said curved sheet and a continuous longitudinal space is maintained therebetween;

a second substantially longitudinal seam formed at an intersection of said first longitudinal edge and said inside surface of said tube; and a third substantially longitudinal seam formed at an intersection of said second longitudinal edge and said outside surface of said tube, wherein said second substantially longitudinal seam is continuously maintained a distance apart from said first substantially longitudinal seam, said longitudinal space thereby defining a second interior passageway bounded by said outside surface of said tube and said inside surface of said arcuate sheet, said second interior passageway in fluid isolation from said first interior passageway.

6. The oilfield tubing string of claim 5 wherein said tube is a rolled sheet of material having a seam formed along first and second longitudinal edges of said rolled sheet.

7. The oilfield tubing string of claim 5 wherein said tubing string has a continuous convex outside surface substantially free of any concavities.

8. The oilfield tubing string of claim 5 wherein said tubing string has a substantially oval cross section.

9. The oilfield tubing string of claim 5 wherein said first interior passageway has a substantially circular cross section.

10. The oilfield tubing string of claim 5 wherein said second interior passageway has a substantially crescentic cross section.

11. An oil field tubing string comprising:

an elongated tube having an inside surface and an outside surface, the tube having a cross section perpendicular to the direction of elongation with a substantially continuously convex outer boundary;

a curved sheet of material having a substantially elongated arcuate configuration with an inside surface, an outside surface, and first and second longitudinal edges, wherein said curved sheet is longitudinally positioned inside said tube such that said inside surface of said tube faces said outside surface of said curved sheet and a continuous longitudinal space is maintained therebetween;

a first substantially longitudinal seam formed at an intersection of said first longitudinal edge and said inside surface of said tube; and a second substantially longitudinal seam formed at an intersection of said second longitudinal edge and said inside surface of said tube, wherein said second substantially longitudinal seam is continuously maintained a distance apart from said first substantially longitudinal seam, thereby defining a first interior passageway bounded by said inside surface of said tube and said inside surface of said arcuate sheet and further defining a second interior passageway bounded by said inside surface of said tube and said outside surface of said arcuate sheet, said second interior passageway in fluid isolation from said first interior passageway.

12. The oilfield tubing string of claim 11 wherein said tube is a rolled sheet of material having a seam formed along first and second longitudinal edges of said rolled sheet.

13. The oilfield tubing string of claim 11 wherein said first interior passageway has a continuous concave inside surface substantially free of any concavities.

14. The oilfield tubing string of claim 11 wherein said first interior passageway has a substantially oval cross section.

15. The oilfield tubing string of claim 11 wherein said second interior passageway has a substantially crescentic cross section.

16. The oilfield tubing string of claim 11 wherein said tubing string has a substantially circular cross section.

17. A method for constructing an oilfield tubing string comprising:

providing a first band having a length, a width, a first longitudinal edge, a second longitudinal edge, a first planar surface, and a second planar surface;

providing a second band having a length, a width, a first longitudinal edge, a second longitudinal edge, a first planar surface, and a second planar surface;

longitudinally positioning said first band beneath said second band;

joining said first and second bands along a first substantially longitudinal seam;

joining said first and second bands along a second substantially longitudinal seam maintained a distance apart from said first seam;

joining said first and second longitudinal edges of said first band along a third substantially longitudinal seam, thereby defining a first interior passageway bounded by said first band; and maintaining a longitudinally continuous space between said first band and said second band, thereby defining a second interior passageway bounded by said first band and said second band.

18. The construction method of claim 17 wherein said first and second longitudinal edges of said first band are rolled away from said second band to join said first and second longitudinal edges.

19. The construction method of claim 17 wherein said first and second longitudinal edges of said first band are rolled toward said second band to join said first and second longitudinal edges.

20. The construction method of claim 17 wherein said width of said first band is substantially greater than said width of said second band.

21. The construction method of claim 17 wherein said second interior passageway has a substantially crescentic cross section.

22. The construction method of claim 17 wherein said first band has a substantially flat configuration and said second band has an arcuate configuration.

* * * * *